United States Patent [19]
Fukuda et al.

[11] Patent Number: 5,946,962
[45] Date of Patent: *Sep. 7, 1999

[54] METHOD FOR MANUFACTURING A TURBINE SHELL

[75] Inventors: Toshikazu Fukuda; Toshihiro Nakashima, both of Neyagawa, Japan

[73] Assignee: Exedy Corporation, Neyagawa, Japan

[ * ] Notice: This patent is subject to a terminal disclaimer.

[21] Appl. No.: 09/136,422

[22] Filed: Aug. 20, 1998

Related U.S. Application Data

[62] Division of application No. 08/880,428, Jun. 23, 1997, Pat. No. 5,868,025.

[30] Foreign Application Priority Data

Jul. 3, 1996 [JP] Japan .................................. 8-173429

[51] Int. Cl.⁶ .................................................. B21D 28/30
[52] U.S. Cl. ............................................. 72/335; 29/889.5
[58] Field of Search ........................... 72/334, 335, 414; 29/889.5

[56] References Cited

U.S. PATENT DOCUMENTS

| | | |
|---|---|---|
| 2,255,894 | 9/1941 | Ormond . |
| 2,360,383 | 10/1944 | Zeidler . |
| 2,779,292 | 1/1957 | Zeidler . |
| 3,316,622 | 5/1967 | Jandasek . |
| 4,356,717 | 11/1982 | Okunishi ................................. 72/334 |
| 4,825,521 | 5/1989 | Frotschner ............................ 29/889.5 |
| 5,243,842 | 9/1993 | Kobayashi et al. ...................... 72/335 |
| 5,346,366 | 9/1994 | Eguchi et al. .......................... 416/180 |
| 5,384,958 | 1/1995 | O'Daniel ............................... 29/889.5 |
| 5,410,902 | 5/1995 | Jacob ..................................... 72/334 |
| 5,522,220 | 6/1996 | Locker .................................... 60/361 |
| 5,575,363 | 11/1996 | Dehrmann ............................ 192/113.3 |

Primary Examiner—Daniel C. Crane
Attorney, Agent, or Firm—Shinjyu An Intellectual Property Firm

[57] ABSTRACT

According to the present invention, a turbine shell is manufactured by a method which includes the steps of preparing a planar blank, simultaneously forming a plurality of blade fixture slits 32A, 32B and 32C in the blank 40, and deforming the blank 40 into a curved concave shape by effecting drawing work.

2 Claims, 5 Drawing Sheets

METHOD FOR MANUFACTURING A TURBINE SHELL

This application is a division of Ser. No. 08/880,428, filed Jun. 23, 1997, now U.S. Pat. No. 5,868,025.

BACKGROUND OF THE INVENTION

1. Field of the Invention

The present invention relates to a method for manufacturing a turbine shell for use in a torque convertor.

2. Description of the Related Art

A torque convertor is a mechanism used for power transmission between an engine and a transmission. A torque converter generally includes a front cover and an impeller shell which together define a fluid filled chamber. Impeller blades are fixed to the impeller shell within the fluid filled chamber. A turbine shell and a stator are also disposed within the chamber, both the turbine shell and the stator being relatively rotatable with respect to the front cover and the impeller shell. The turbine shell is disposed within the chamber and arranged to confront with the front cover. The turbine shell is formed with a plurality of turbine blades fixed to one side of the turbine shell facing the impeller blades of the impeller. A turbine hub is fixed to the inner circumferential portion of the turbine shell by rivets. The turbine hub is configured to be connected to the input shaft of the transmission.

Typically, when viewed in cross section, the turbine shell has a curved contour having a concave and arcuate shape. The concave and arcuate shape is necessary for receiving fluid from the impeller. Rotation of the impeller causes fluid in the fluid filled chamber to move toward the turbine shell. In order to efficiently capture and transmit the force of the fluid movement, the concave and arcuate shape of the turbine shell has been developed over the years of torque convertor usage. Further, each turbine blade is curved forming a vane that conforms with the shape of the turbine shell. Specifically, each turbine blade has a first arcuate edge shaped to conform to the concave and arcuate shape of the turbine shell. The first arcuate edge is fixed to the turbine shell. A second arcuate edge of each turbine blade is shaped to receive fluid moved by the impeller. The second arcuate edge faces the impeller. Typically, tabs are formed on the first arcuate edge at three positions of each turbine blade: an inner circumferential portion, an outer circumferential portion and an intermediate portion. The tabs are shaped to extend into slits formed in the turbine shell. The tabs are pressed or deformed after being inserted into the slits.

The turbine shell of the above-described conventional torque convertor is typically manufactured by the following steps. First of all, a flat metal material is punched to form an outer circumferential circle defining a disc shaped member. The disc shaped member is then punched to form an inner circumferential hole in its center. Next, the disc shaped member is deformed by drawing work to have a curved concave shape (when viewed in a side, cross sectional view). Subsequently, a plurality of slits are formed in the curved concave portion. It is necessary to punch out the above described slits after the disc shaped member has been deformed to have the curved concave shape in order to insure that the slits properly align with the tabs on the turbine blades. Specifically, the inner circumferential slits, the outer circumferential slits and the intermediate slits must align with the above described tabs. In order for proper alignment, the slits are formed in stages or steps. The inner circumferential slits are first formed at appropriate positions on the turbine shell while the shell is rotated. Subsequently, the intermediate slits are formed at a plurality of appropriate positions and finally, the outer circumferential slits are formed at a plurality of appropriate positions.

Thus, in the conventional turbine shell manufacturing method, the slits are formed in three separate stages or steps. Consequently, the manufacturing costs are correspondingly high.

SUMMARY OF THE INVENTION

An object of the present invention is to manufacture a turbine shell with reduced expenses.

In accordance with one aspect of the invention, a turbine shell of a turbine of a torque converter is manufactured by a method including the following steps:

forming a plate having a planar disc-shape;

punching out three sets of slits simultaneously in the plate, each set of slits having a differing predetermined width, the slits being formed in a first portion of the plate; and deforming the first portion of the plate to form a curved concave shape, leaving a second portion of the plate with a generally planar contour.

Preferably, the method includes the step forming apertures in the second portion of the plate after the deforming step.

Alternatively, the method includes the step deforming the plate after the forming step and before the punching step to form an intermediate curved concave shape in the first portion.

Preferably, after the deforming step, the slits all have generally the same width due to the deforming of the first portion in the deforming step.

In accordance with another aspect of the invention, a turbine shell of a turbine of a torque converter is manufactured by a method including the following steps:

forming a planar disc plate;

deforming a first portion of the plate such that the first portion has in intermediate a curved concave shape;

forming slits by simultaneously punching out a plurality of blade fixture slits in the first portion of the plate; and deforming the first portion of the plate again such that the first portion has in a curved concave shape that is deeper than the intermediate the curved concave shape of first portion.

Preferably, after the second of the deforming steps, the slits all have generally the same width due to the deforming of the first portion in the second of the deforming steps.

In the method for manufacturing the turbine shell according to the present invention, since the plurality of blade fixture slits are simultaneously punched out in the disc plate in the slit forming step, it is possible to reduce the manufacturing costs, compared to the prior art where the differing sets of slits are formed one set at a time.

The present invention is described below with reference to the accompanying drawings where like reference numerals denote like elements throughout the drawings.

DESCRIPTION OF THE PREFERRED EMBODIMENTS

The present invention will now be described with reference to the accompanying drawings.

First Embodiment

Figure 1:
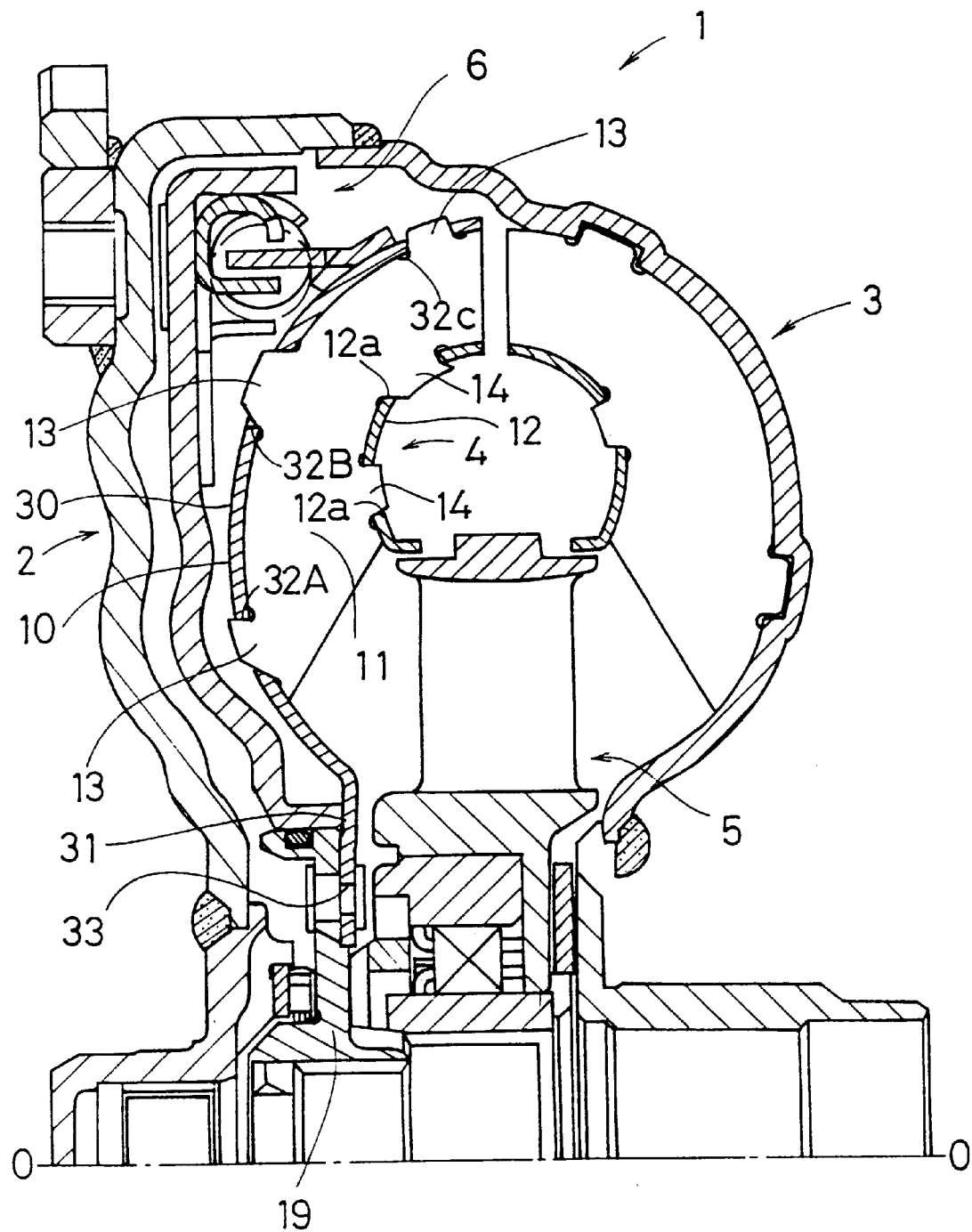
FIG. 1 is a fragmentary, side sectional view showing a torque converter having a turbine shell in accordance with the present invention.
Figure 2:
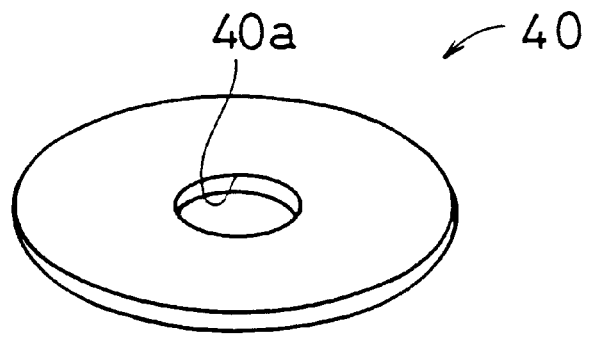
FIG. 2 is a perspective view showing one step of a method for manufacturing the turbine shell in accordance with a first embodiment of the present invention.

A torque convertor 1 shown in FIG. 1 includes a front cover 2, three kinds of vane wheels: an impeller 3, a turbine 4 and a stator 5. The torque convertor 1 also includes a lockup clutch 6 disposed between the front cover 2 and the turbine 4. The torque convertor 1 is shown for illustrating the general structure of the torque convertors. However, the application of the present invention is not limited to this type torque convertor depicted in FIG. 1. For instance, torque convertors having a different lock-up clutch, no lock-up clutch, or a different stator structure and configuration may also employ the present invention.

The front cover 2 is a member configured to be connected to a crankshaft (not shown) of an engine (not shown). An outer circumferential edge of the front cover 2 is fixed to the impeller 3. The impeller 3 is composed of the impeller shell and a plurality of impeller blades fixed on the inside of the impeller shell.

The turbine 4 is composed of a disc-like turbine shell 10, a plurality of turbine blades 11 fixed to the turbine shell 10, a turbine hub 19 fixed to the inner circumferential side of the turbine shell 10, and an inner shell 12 fixed, on the side of the impeller 3, to the turbine blades 11.

The turbine shell 10 is a plate-like member made of sheet metal and includes a drawn curved portion 30 having, in cross section, a curved arcuate shape. The turbine shell 10 also includes annular fixture portion 31 formed on the inner circumferential portion of the curved portion 30. The drawn curved portion 30 is shaped for the purpose of effectively recirculating a working oil flowing from the impeller 3. A plurality of slits are formed in the drawn curved portion 30. The slits include a large number of inner circumferential slits 32A, intermediate slits 32B and outer circumferential slits 32C, which are respectively arranged in the circumferential direction. Furthermore, a plurality of rivet holes 33 are formed in the annular fixture portion 31. The inner circumferential portion of the turbine shell 10 is fixed to the turbine hub 19 by rivets 20 passing through the rivet holes 33.

The plurality of turbine blades 11 have an arcuate shape (vane shape) and conform with the cross-sectional shape of the drawn curved portion 30 of the turbine shell 10. Three tabs 13 are formed on an outer arcuate edge of each turbine blade 11 extending into the corresponding slits in the turbine shell 10. Each tab 13 is inserted and caulked into the slit 32A, 32B or 32C of the turbine shell 10. Two tabs 14 are formed in an inner arcuate edge of the turbine blades 11 on a side facing the impeller 3. The tabs 14 are inserted and caulked into slits 12a formed in the inner shell 12. Incidentally, the inner shell 12 has an arcuate cross section partially defining a hollow portion. The hollow portion has a circular cross section and is also defined by the radially outer shell of the stator 5 and a portion of the impeller 3.

A method for manufacturing the turbine shell 10 will now be described with reference to FIGS. 2, 3, 4 and 5.

Figure 3:
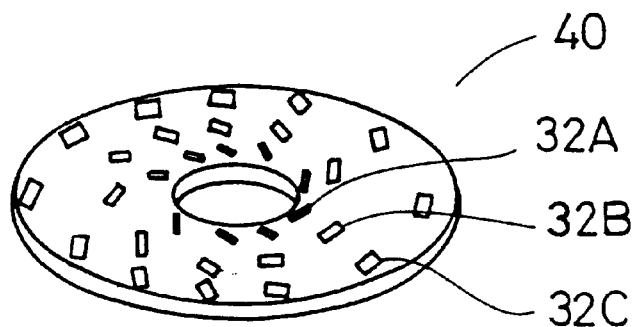
FIG. 3 is a perspective view showing another step of a method for manufacturing the turbine shell in accordance with the first embodiment.
Figure 4:
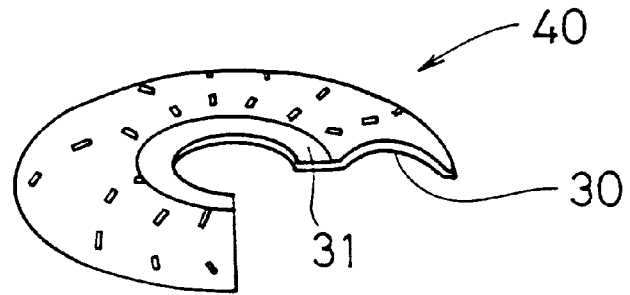
FIG. 4 is a schematic perspective view showing still another step of a method for manufacturing the turbine shell in accordance with the first embodiment.

First of all, a disc-like blank 40 is cut out or punched out from sheet metal material. At this time, a central hole 40a is formed in the blank 40. Subsequently, as shown in FIG. 3, all the slits including the inner circumferential slits 32A, intermediate slits 32B and outer circumferential slits 32C are simultaneously punched out. However, in forming the slits, a predetermined size is provided for each set of slits such that, at this stage of the manufacturing process, the width of the outer circumferential slits 32C is the largest of the three slits and the widths of the inner circumferential slits 32B and the inner circumferential slits 32A are smaller with the slits 32A being the smallest of the three sets of slits.

Figure 5:
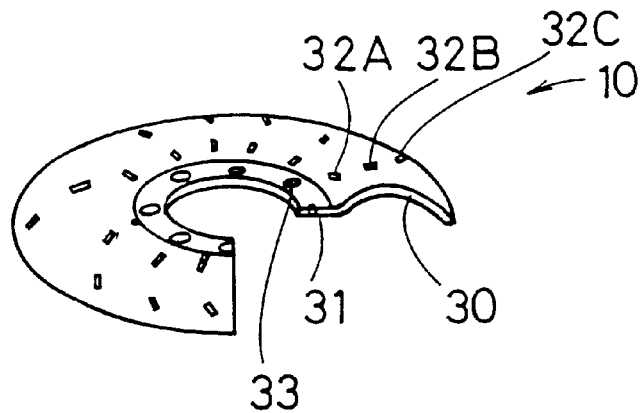
FIG. 5 is a schematic perspective view showing still another step of a method for manufacturing the turbine shell in accordance with the first embodiment.
Figure 6:
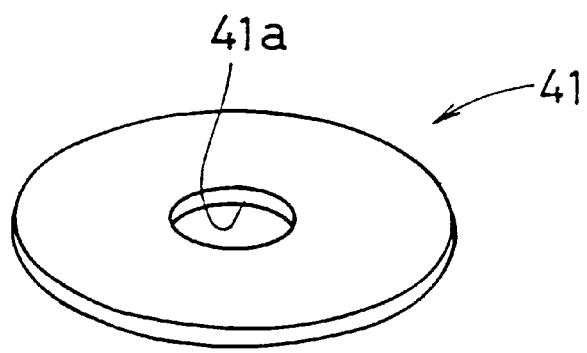
FIGS. 6, 7, 8, 9 and 10 are a perspective views showing various steps for manufacturing the turbine shell in accordance with a second embodiment.
Figure 7:
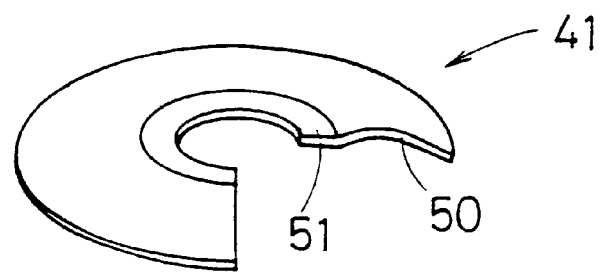

Thereafter, the drawn curved portion 30 and the annular fixture portion 31 are formed in the blank 40 by deforming or drawing work. After the drawing work, or more precisely, as a result of the drawing work, the three sets of slits 32A, 32B and 32C are generally the same width. This is because during the drawing work, the cirumferential outermost portions of the blank 40 undergoes relatively large amounts of deformation to provide the depicted shape to the drawn curved portion 30. As a result of the deformation, the width of the outer circumferential slits 32C is decreased accordingly. Further, the width of the intermediate slits 32B is also decreased, but not as much as the decrease in width of the outer circumferential slits 32C. However, the width of the inner circumferential slits 32A is increased slightly. Finally, as shown in FIG. 5, the rivet holes 33 are formed in the annular fixture portion 31 by a piercing or punching process. The turbine shell 10 shown in FIG. 5 is thus produced.

In this manufacturing method, since, as shown in FIG. 3, all the slits 32A, 32B and 32C are simultaneously punched out before the drawn curved portion 30 is formed, the production costs may be reduced when compared to prior art methods.

Second Embodiment

Figure 8:
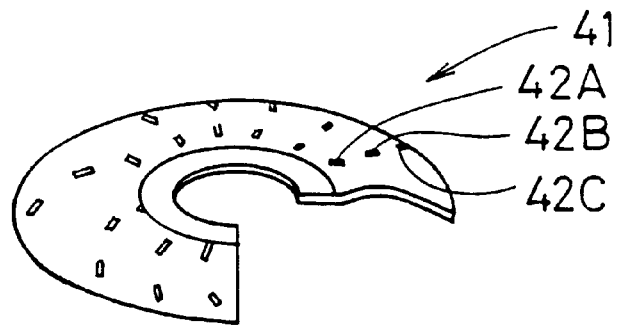
Figure 9:
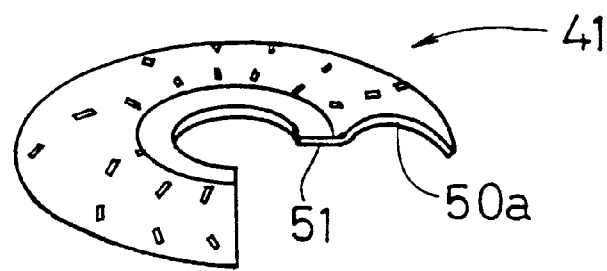

A method for manufacturing a turbine shell 60 in accordance with a second embodiment will now be described with reference to FIGS. 6, 7, 8, 9 and 10. In the second embodiment, a blank 41 is first punched out into a disc-like shape from metal sheet. At this time, a center hole 41a is also formed in the blank 41. Subsequently, the blank 41 is subjected to drawing work to form a shallow drawn curved portion 50 and an annular fixture portion 51. In this case, the drawn curved portion 50 is shallower than the drawn curved portion upon the completion and is only an intermediate step. Subsequently, as shown in FIG. 8, inner circumferential slits 42A, intermediate slits 42B and outer circumferential slits 42C are simultaneously punched out. In the second embodiment, the width of the outer circumferential slits 42C is the largest of the three slits and the width of the inner circumferential slits 42B is less than that of the outer circumferential slits 42C and the width of the inner circumferential slits 42A is the smallest of all of the sets of slits. In the second embodiment, since the shallow drawn curved portion 50 is formed to be shallower than the final product, it is possible to simultaneously form the slits. Subsequently, as shown in FIG. 9, a second drawing work step is performed to make the curve of the shallow drawn curved portion 50 deeper to form a deep drawn curved portion 50a.

Figure 10:
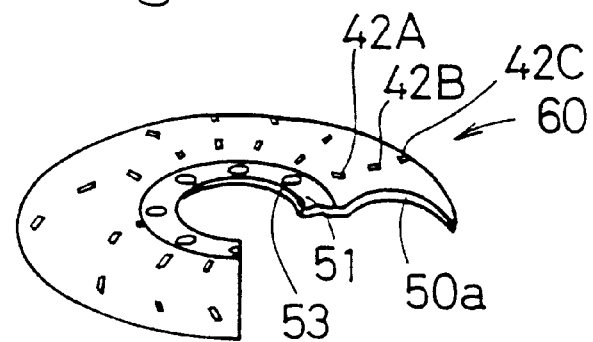

After the second drawing work step, the width of each slit 42A, 42B and 42C becomes substantially constant. This is because by the second drawing work step, the slit width of the outer circumferential slits 42C is decreased, the slit width of the intermediate slits 42B is decreased only slightly and the slit width of the inner circumferential slits 42A is increased slightly. Finally, as shown in FIG. 10, the rivet holes 53 are formed in the annular fixture portion 51.

In the above described manufacturing method, since, as shown in FIG. 8, all the slits 42A, 42B and 42C are simultaneously punched out, the production costs are reduced when compared to the prior art manufacturing methods.

Figure 11:
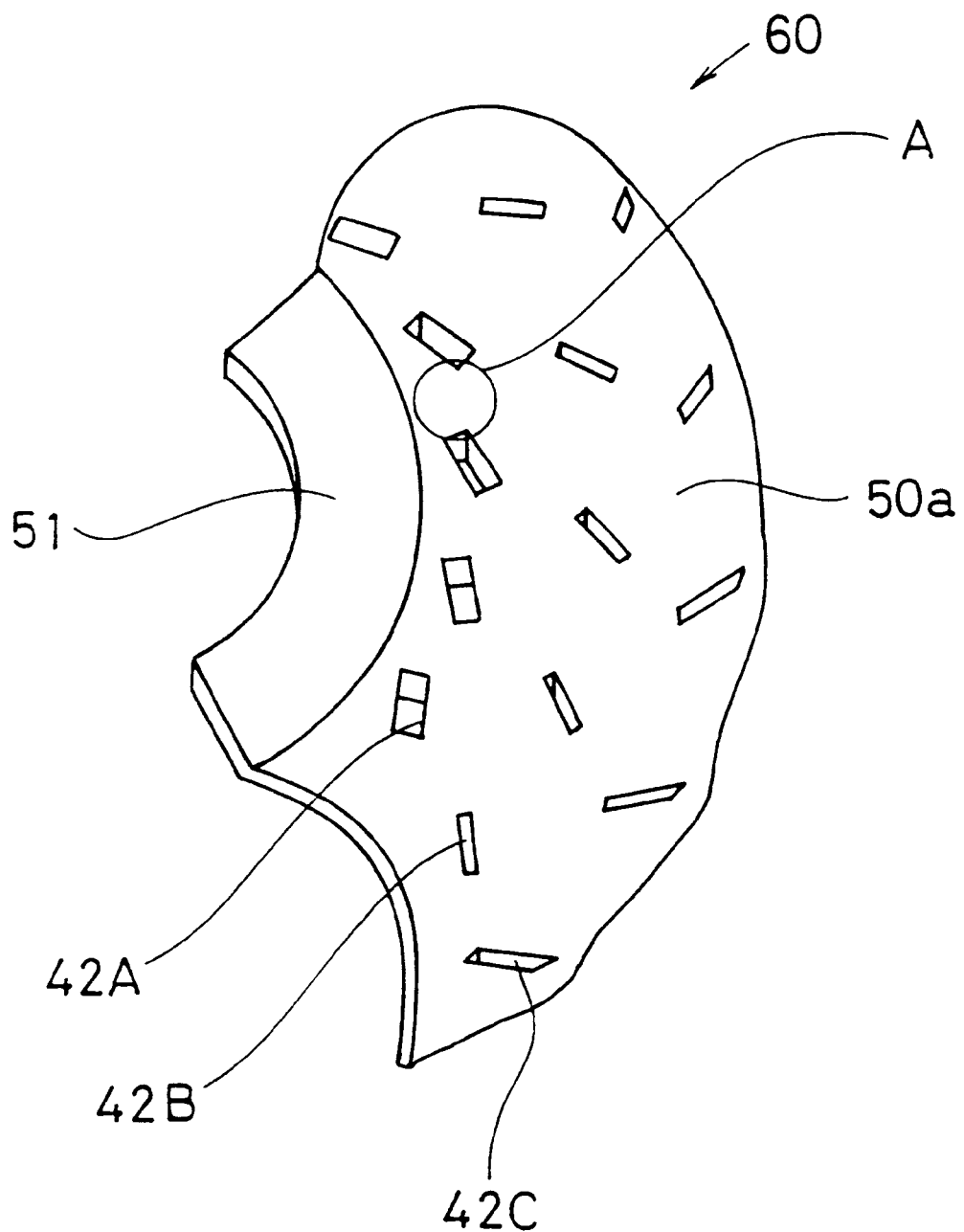
FIG. 11 is a fragmentary perspective view showing a portion of the turbine shell manufactured in accordance with the present invention.

In the second embodiment, as described above, after the shallow drawing work is effected, the slits 42A, 42B and 42C are formed. Therefore, the precision of the width of the respective slits 42A, 42B and 42C may be enhanced slightly compared to the first embodiment. Furthermore, the reduction of the material thickness of the blank 41 which occurs in the vicinity of the inner circumferential slits 42A (parts encircled by a circle A in FIG. 11) in the vicinity at the outer edges of the annular fixture portion 51 may be suppressed. The reduction of thickness may be suppressed in the range about 0.1 to 0.05 mm.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A method for manufacturing a slotted turbine shell for retaining turbine blades on fixing tabs to form a torque converter turbine, the method comprising the steps of:

(a) performing one of working a metal sheet to form a blank as a planar disc with a central hole, and working a metal sheet to form a blank as an intermediate-stage concave annulus with a planar inner rim;

(b) punching out simultaneously from the blank formed in said step (a) a plurality of circularly spaced slots in concentric sets, wherein the slots lying on a common circle share a common width and said common width is different between slots lying on different circles; and (c) working the blank punched in said step (b) into a finished-stage concave annulus with a planar inner rim.

2. The method for manufacturing a slotted turbine shell as set forth in claim 1, wherein the common width of the slots lying on a common circle is dimensioned such that following said step (c), said common width is the same between slots lying on different circles.

* * * * *